United States Patent
Pircon et al.

(10) Patent No.: US 7,228,956 B2
(45) Date of Patent: Jun. 12, 2007

(54) BULK MATERIAL PRECISION TRANSFER CHUTE APPARATUS

(75) Inventors: John S. Pircon, Oak Brook, IL (US); Ronald A. Westfall, Buffalo, MO (US); Gregory A. Clark, Gallatin, TN (US)

(73) Assignee: Benetech, Inc., Montgomery, IL (US)

( * ) Notice: Subject to any disclaimer, the term of this patent is extended or adjusted under 35 U.S.C. 154(b) by 167 days.

(21) Appl. No.: 11/032,441

(22) Filed: Jan. 10, 2005

(65) Prior Publication Data

US 2006/0151280 A1    Jul. 13, 2006

(51) Int. Cl.
*B65G 47/44*   (2006.01)
(52) U.S. Cl. .......................... 198/560; 193/22; 193/16
(58) Field of Classification Search ............... 198/560, 198/561, 562; 193/3, 16, 17, 22, 2 A, 28
See application file for complete search history.

(56) References Cited

U.S. PATENT DOCUMENTS

| | | | | |
|---|---|---|---|---|
| 1,047,866 A | * | 12/1912 | Weller | 193/22 |
| 1,524,334 A | * | 1/1925 | Brown | 193/16 |
| 1,800,920 A | * | 4/1931 | Wilson et al. | 193/22 |
| 1,814,619 A | * | 7/1931 | Carter | 193/22 |
| 2,219,226 A | * | 10/1940 | Gerber | 193/17 |
| 2,859,873 A | * | 11/1958 | Bresee | 193/28 |
| 3,568,819 A | * | 3/1971 | Mann | 198/560 |
| 6,578,694 B2 | * | 6/2003 | Harris et al. | 193/16 |

* cited by examiner

*Primary Examiner*—James R. Bidwell
(74) *Attorney, Agent, or Firm*—Thompson Coburn LLP (57) ABSTRACT

A bulk material precision transfer chute apparatus transfers a flow of material from a discharge conveyor to a separate receiving conveyor. The apparatus receives a flow of material from the discharge conveyor and transfers that material to a receiving conveyor depositing the material in a precise manner that avoids spillage of the material from the receiving conveyor, avoids wear to the receiving conveyor, and avoids excess dust generation from the transfer of the material.

21 Claims, 9 Drawing Sheets

BULK MATERIAL PRECISION TRANSFER CHUTE APPARATUS

BACKGROUND OF THE INVENTION (1) Field of the Invention

The present invention pertains to a bulk material transfer chute that transfers a flow of material from a discharge conveyor to a separate receiving conveyor. In particular, the present invention pertains to a precision transfer chute that receives a flow of material from a discharge conveyor and transfers that material to a receiving conveyor and deposits the flow of material onto the surface of the receiving conveyor in a precise manner that avoids spillage of the material, avoids excess dust generation from the transfer of the material, reduces material degradation, reduces stress and wear of the receiving conveyor components thereby reducing maintenance and repair costs, and reduces the power requirements of the receiving conveyor.

(2) Description of the Related Art

The transporting of bulk material, for example coal, from one area to another often involves the transfer of a stream or flow of the material from one conveyor apparatus to another conveyor apparatus. In the transfer of the material from the one conveyor to the other conveyor, it is often necessary that the material be discharged from a discharge end of the one conveyor and transferred onto a receiving end of the other conveyor. To facilitate this transfer of the bulk material, large hoppers or transfer chutes have been designed that receive the flow of material from the discharge conveyor and deposit or discharge the flow of material onto the receiving conveyor.

The design of bulk material transfer chutes has remained basically unchanged for over the past 50 years. The typical transfer chute has a general box-like trapezoidal configuration with interior corners and edges where fine coal and dust can accumulate and create a fire or explosion hazard. The discharge conveyor is positioned at the top of the chute and the receiving conveyor is positioned at the bottom of the chute. The top opening of the transfer chute has a general rectangular configuration with interior corners and edges and at least one flat end wall positioned opposite the discharge end of the discharge conveyor. Material, for example coal, discharged from the discharge conveyor often impacts against the flat end wall before falling downwardly into the interior of the chute due to gravitational forces.

The coal falls downwardly through a transition section of the chute. The chute transition section has flat sidewalls that meet at angled interior corners and converge as they extend downwardly, with the cross sectional area of the chute's transition section reducing as the chute extends downwardly.

A loading section is positioned below the chute transition section. The loading section also has flat side walls with angled interior corners and sliding interior surfaces that direct the coal in the direction and speed of the receiving conveyor.

A loading skirt is positioned at the bottom of the loading section. The loading skirt has sidewalls that extend along a portion of the receiving conveyor length, and a top wall or cover that extends over the skirted portion of the receiving conveyor. The chute loading section discharges the bulk material onto the portion of the receiving conveyor inside the loading skirt. The loading skirt sidewalls prevent spillage of coal from the sides of the conveyor resulting from the turbulence of the material transferred onto the conveyor, and the top wall forms a dust containment chamber with the sidewalls to minimize dust created by the turbulence. The turbulence is created in the material by the uncontrolled flow of the material through the chute and the change in the material velocity when the faster moving material impacts with the slower moving receiving conveyor. The skirt functions to minimize dust and spillage of the bulk material that pours from the bottom of the loading section onto the receiving conveyor. The skirt is also intended to minimize the dust generated by material such as coal, pouring through the bottom of the loading section and impacting with the belt surface of the receiving conveyor.

Rubber seals are commonly arranged along the outer sides of the skirt sidewalls adjacent to the receiving conveyor. The rubber seals are mounted to the skirt sidewalls by means of clamping-type apparatus. The apparatus hold the rubber seals in contact with the receiving conveyor and form a seal with the receiving conveyor that prevents the passage of dust from the receiving conveyor. The rubber seals are designed as consumable parts, and through their constant contact with the receiving conveyor in providing an efficient seal, require regular maintenance and frequent replacement. Additionally, the constant pressure of the contact of the seals against the receiving conveyor on both sides of the conveyor system creates a frictional drag on the receiving conveyor that requires increasing the horsepower of the receiving conveyor motive source, thus increasing the cost of operating the conveyor.

The conventional bulk material transfer chute described above is disadvantaged in several respects. The bulk material discharged from the discharge conveyor that impacts with the transfer chute at the top of the chute interior creates dust, reduces the size of the material deposited into the chute, and causes wear to the wall of the chute that is impacted by the material. The impact of the material with the interior wall surfaces and corners causes a continuous build-up of material and can cause plugging of the chute. The plugging stops the flow of material through the chute and increases safety risks due to the potential for fire or an explosion, and increases maintenance costs to clear the plug. The material that falls through the chute transition section can spread out and entrain air that carries dust through the chute and out of the chute. In some chute transition and loading section designs, the freefall of the bulk material through the chute and onto the surface of the receiving conveyor can cause wear to the conveyor and can generate dust or spillage. The random flow of the material through the chute can cause off center loading of the material on the surface of the receiving conveyor. This often results in spillage of the material from the sides of the receiving conveyor which increases maintenance costs for maintaining the skirting, and presents a safety and health hazard due to dust generation which could be inhaled by persons or could create a fire or explosion hazard. The need for the loading skirt at the output of the chute transition section also adds to maintenance costs and increases the overall cost and health and safety risks of the transfer chute. The skirt drags on the conveyor causing wear to the conveyor and skirt, and increases power requirements of the conveyor. The skirt drag also requires that the skirt and conveyor be repaired or components replaced more frequently.

Recent advancements have been made in controlling the material stream and velocity through the chute by means of computer-generated discrete element modeling (DEM). Discrete element modeling accounts for the bulk material particle size and a theoretical coefficient of friction which simulates varying chute liner materials in an effort to predict the behavior of the material as it passes through the chute.

The angular slope of the chute interior walls are arranged and adjusted so as to control the velocity of the bulk material passing through the chute and maintain a compressed material profile passing through the chute.

While DEM has proved to be successful in many applications, this method of chute design also has distinct disadvantages. DEM, as with conventional chute design, employs the use of a skirt system at the loading point on the receiving conveyor, with the same components and disadvantages as described previously.

Additionally, DEM is based on a single bulk material particle size and coefficient of friction controlling the material profile and velocity as it passes through the chute. Often these particular design criteria vary throughout the expected life of a bulk material handling system. In a power plant application, frequently material particle size changes due to altering suppliers of coal and often due to associated equipment performance such as coal crushers and granulators. This change in particle size would result in the necessity to remodel the design of the chute to accurately control the velocity and profile of material passing through the chute. Environmental conditions such as high moisture content due to heavy rain and freezing conditions, adversely affect the coefficient of friction between the bulk material particles and the boundary surfaces of the chute interior. This change in the coefficient of friction as a result of varying environment conditions renders the DEM inefficient in controlling material velocity.

SUMMARY OF THE INVENTION

The bulk material precision transfer chute apparatus of the present invention overcomes the disadvantages associated with prior art transfer chutes discussed above by providing an adjustable and novel transfer and loading chute construction that transfers bulk material from a discharge conveyor to a receiving conveyor while controlling the material velocity and profile, avoiding material degradation, reducing the generation of dust, reducing accumulation of material within the chute, and reducing wear to the transfer chute and receiving conveyor. The transfer chute of the invention also eliminates the need for a loading skirt, thereby reducing the transfer chute manufacturing costs, maintenance costs, safety and health risks, and energy consumption. The chute construction provides the benefits of vertical adjustments of the chute flow path to best suit it for the condition of the coal (i.e. wet or dry). Wet coal could be dropped more vertically to prevent build-up and to adjust the velocity of discharge to the receiving conveyor. Horizontal adjustment also allows for center loading of the receiving conveyor. The adjustability avoids plugging of the chute.

The bulk material transfer chute apparatus of the present invention is comprised of a curved hood positioned at the top of the chute, a curved or round funnel-shaped transition section, and an adjustable, round loading tube positioned below the transition section. The component parts of the transfer chute are constructed of a metal or other similar type of abrasion resistant material and are supported by an exterior framework. A discharge conveyor conveys bulk material, for example coal, into the transfer chute at the top of the chute, and a receiving conveyor conveys the material discharged from the bottom of the chute.

The hood section of the transfer chute has a curved configuration. The hood is positioned opposite the discharge end of the discharge conveyor and redirects material discharged from the conveyor into a top opening of the chute transition section. The hood section is designed so that an opening device can be applied to allow easy access to the chute interior. This method of accessibility provides lower maintenance costs and increased safety. The curved shape of the hood captures the material and maintains a compact material profile. The hood is resistant to wear and reduces material impact forces, thereby minimizing the degradation of material and the generation of dust.

The transition section has a top opening that receives the material redirected by the hood. The material redirected by the curved hood slides downwardly through the interior volume of the transition section. The transition section has a general funnel shape with rounded corners. A cross sectional area of the transition section interior decreases as the transition section extends downwardly. The transition section is constructed of rolled or rounded plates that are designed to allow the material sliding through the transition section to concentrate into a compressed stream with a reduced cross sectional area profile as the material is directed downwardly toward the bottom of the transition section. The walls of the transition section are designed with a sufficient slope and curvature to prevent the build-up of the material in the transition section, even if the flow of material is stopped by stopping the receiving conveyor. The sloped walls of the transition section and the reducing cross sectional area of the transition section control material flow through the section and minimize entrained air in the material, minimize accumulation of material, minimize the degradation of the material, and minimize the generation of dust due to reduced turbulence of the material. The slope of the transition section walls together with materials of construction such as lining material that improves the velocity of the material flow control the velocity of the material through the section to match the velocity of the receiving conveyor. The transition section can also be equipped with an internal diverter plate that assists in controlling the flow of material through the section to ensure center loading of the material on the receiving conveyor.

The loading tube of the transfer chute apparatus is mounted at the bottom of the transition section. The loading tube has an interior bore with a circular cross section along its length. The circular cross section of the loading tube bore allows the material flowing through the tube to scour away any build-up and eliminates any corners for the material to accumulate.

The length of the loading tube is curved as it extends from the transition section toward the receiving conveyor. The curved loading tube length and its adjustable downward angle are designed to place the material discharged from the tube onto the conveyor belt at an angle of discharge that minimizes impact of the material on the belt, thereby reducing impact damage to the belt and minimizing the generation of dust. The output end of the loading tube is adjustable both horizontally and vertically and is dimensioned and shaped so that it positions the discharged material onto the receiving conveyor evenly, centered, and in a profile similar to the final, settled profile of the material on the conveyor. This minimizes the likelihood of spillage from the belt.

A connection assembly mounts the loading tube to the bottom end of the transition section. The connection assembly enables movement of the loading tube through an arc segment relative to the transfer chute apparatus. A rubber seal or boot surrounds the connection between the loading tube and the transition section to provide a primary dust tight seal. A secondary dust seal is also provided inside the boot.

In the preferred embodiment, the upper end of the loading tube is connected to a lower end of the transition section by a pivot connection. A cylindrical bottom portion of the transition section is smaller than the cylindrical upper portion of the loading tube. The smaller diameter dimension of the transition section bottom portion relative to the loading tube upper portion enables the loading tube to extend upwardly surrounding the transition section, enabling free pivoting movement of the loading tube relative to the transition section.

An adjustment mechanism is connected between the loading tube and the chute transition section. Adjusting the length of the mechanism adjusts the angular position of the loading tube relative to the transition section. The mechanism allows for the angular adjustment of the loading tube relative to the receiving conveyor, thereby enabling the adjustment of the angle of discharge of material from the loading tube onto the belt of the receiving conveyor. The angular adjustment of the loading tube relative to the receiving conveyor controls the velocity of the material flow through the chute and thereby prevents plugging and minimizes spillage of the material discharged from the tube and placed onto the conveyor belt.

BRIEF DESCRIPTION OF THE DRAWING FIGURES

Further features of the bulk material precision transfer chute apparatus of the invention are set forth in the following detailed description of the apparatus and in the drawing figures wherein.

DETAILED DESCRIPTION OF THE PREFERRED EMBODIMENT

Figure 1:
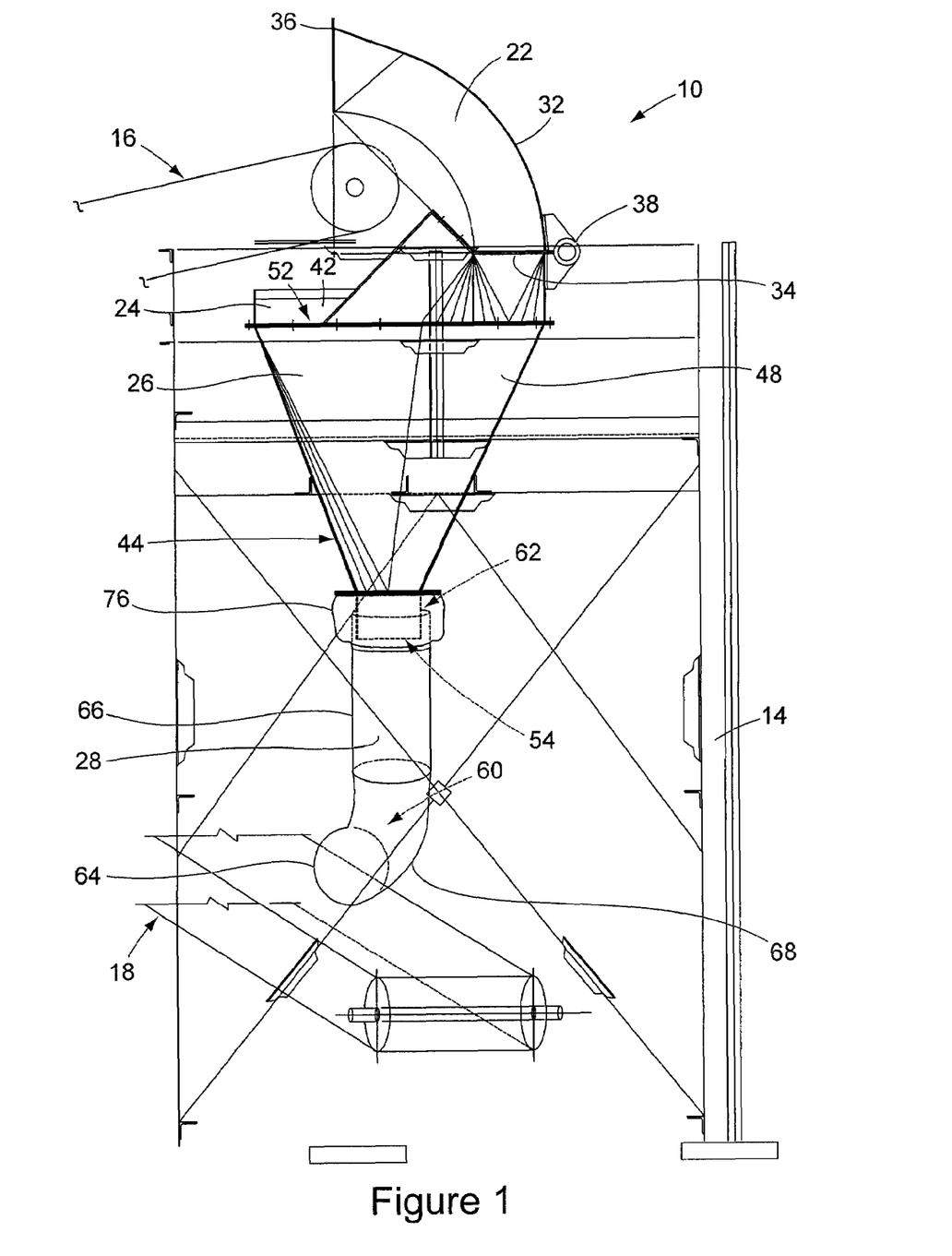
FIG. 1 is a side elevation view of the bulk material precision transfer chute apparatus of the invention shown positioned between a discharge conveyor and a receiving conveyor.
Figure 2:
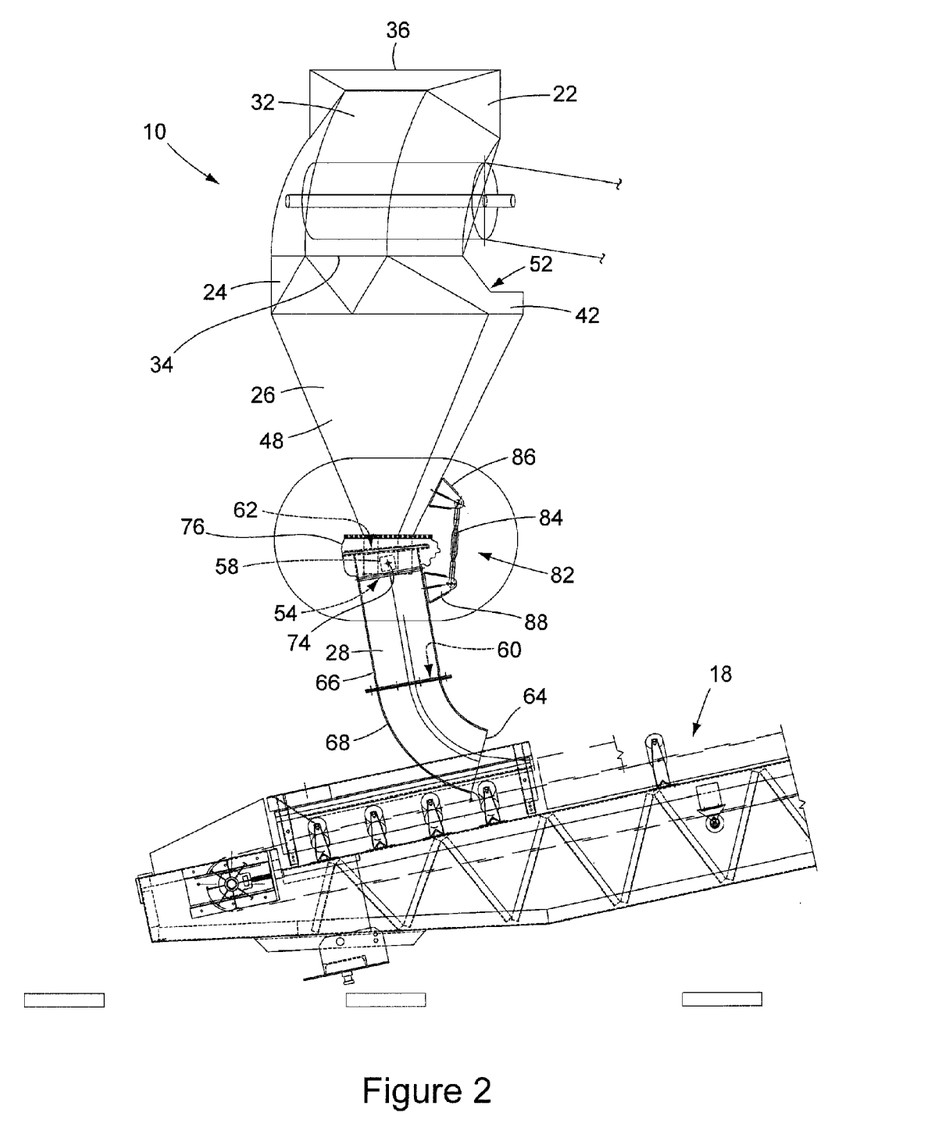
FIG. 2 is an elevation view similar to that of FIG. 1, but showing an opposite side view of the transfer chute apparatus.
Figure 3:
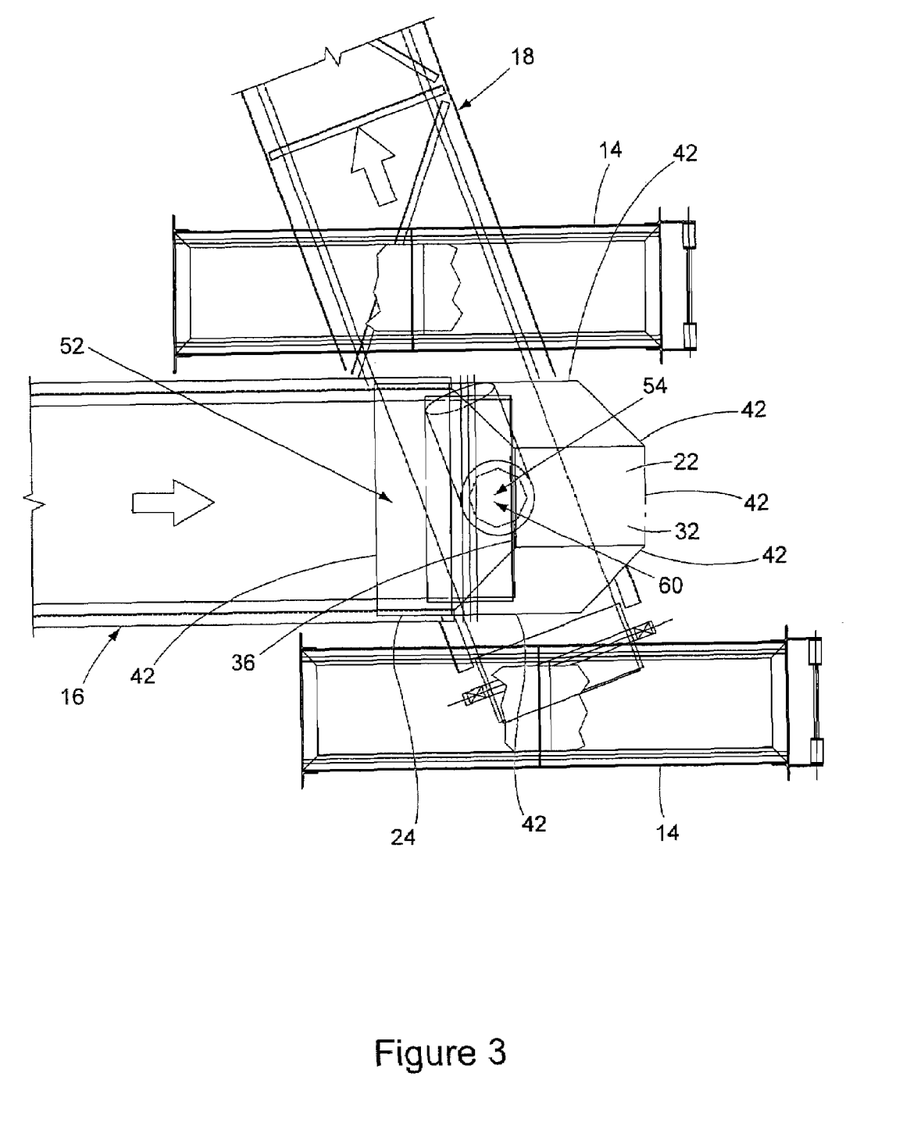
FIG. 3 is a top plan view showing the relative positions of the transfer chute apparatus and the discharge conveyor and receiving conveyor.

FIGS. 1 and 2 show an embodiment of the bulk material precision transfer chute apparatus 10 of the present invention. The apparatus 10 is shown in FIG. 1 supported by a schematically represented framework 14 between the discharge end of a discharge conveyor 16 and the receiving end of a receiving conveyor 18. In the illustrative environment of the apparatus 10 shown in FIGS. 1, 2, and 3, the apparatus is used to transfer bulk material, for example coal, from the discharge conveyor 16 positioned above the apparatus to the receiving conveyor 18 positioned below the apparatus. It should be understood that the environment shown in FIGS. 1, 2, and 3 is illustrative only, and should not be interpreted as limiting. As shown in FIGS. 1 and 2, the bulk material transfer apparatus 10 of the invention is basically comprised of a hood 22 positioned at the top of the apparatus, a transition section 26 positioned below the hood 22, and a loading tube 28 positioned below the transition section 26. Each of these component parts of the apparatus are constructed or lined of metal or other types of materials that are resistant to abrasion and wear. The discharge conveyor 16 and receiving conveyor 18 are shown schematically to represent the typical constructions of belt conveyors. Other types of conveying apparatus may also be employed with the bulk material transfer chute apparatus of the invention.

The hood 22 is shown in FIGS. 1, 2, 3, and 4. The hood 22 is basically comprised of a vertically curved wall 32. The wall 32 extends as a continuous curved surface from a bottom edge 34 of the hood positioned on the transition section 26, and an opposite top edge 36 of the hood that is positioned over a top opening of the transition section 26. The curved vertical surface of the hood wall 32 functions to guide material conveyed by the discharge conveyor 16 into the transition section 26. The curved vertical surface of the hood wall 32 redirects bulk material, for example coal, discharged from the discharge conveyor 16 downwardly into the transition section while reducing the impact force of the discharged material against the interior surface of the hood 22. As can best be seen in FIGS. 2 and 3, the hood wall 32 also has a general horizontally curved interior surface. This horizontal curvature of the hood wall 32 also functions to redirect and minimize entrained air in the bulk material discharged from the discharge conveyor 16 downwardly into the transition section 26.

Figure 4:
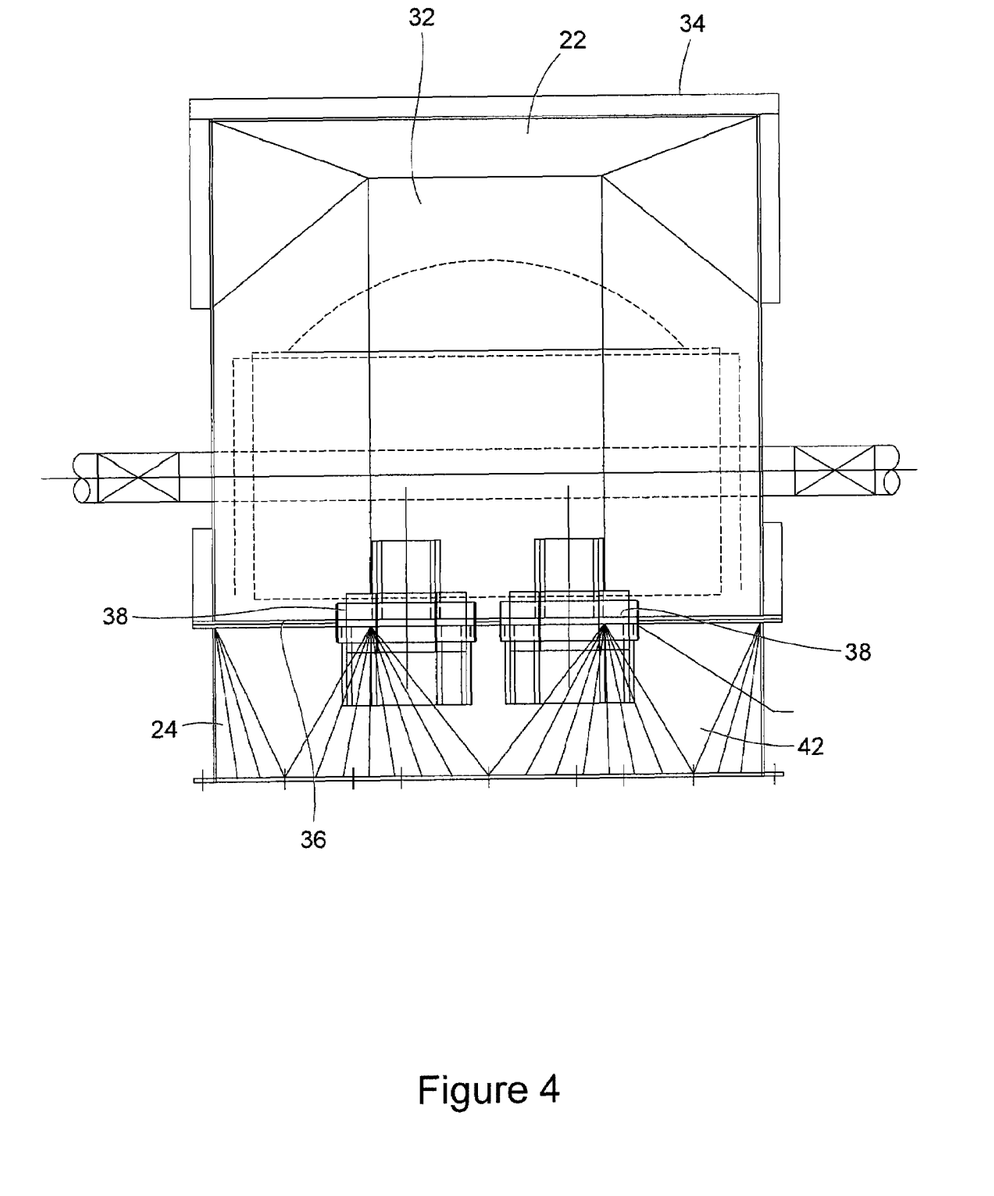
FIG. 4 is a rear view of an upper portion of the transfer chute apparatus.

A pair of hinge assemblies 38 shown in FIGS. 1 and 4 connect the hood bottom edge 34 to the transition section 26. The hinge assemblies 38 enable the hood to be pivoted between a first position shown in FIG. 1, with the hood top edge 36 positioned directly above the transition section 26, and a second position of the hood relative to the transition section 26 where the hood 22 is displaced to one side of the transition section 26. In the second position of the hood 22 it is clear of the discharge conveyor 16 and the transition section for servicing of these components.

The transition section 26 supports the hood 22 on the apparatus 10. The hood could be supported by other separate structures. As best seen in FIG. 3, the top of the transition section 26 has a polygonal configuration defined by a plurality of side walls 42 that surround an interior volume of the top of the section. The side walls 42 define the top opening of the transfer chute interior volume that extends downwardly into the transition section 26.

Figure 5:
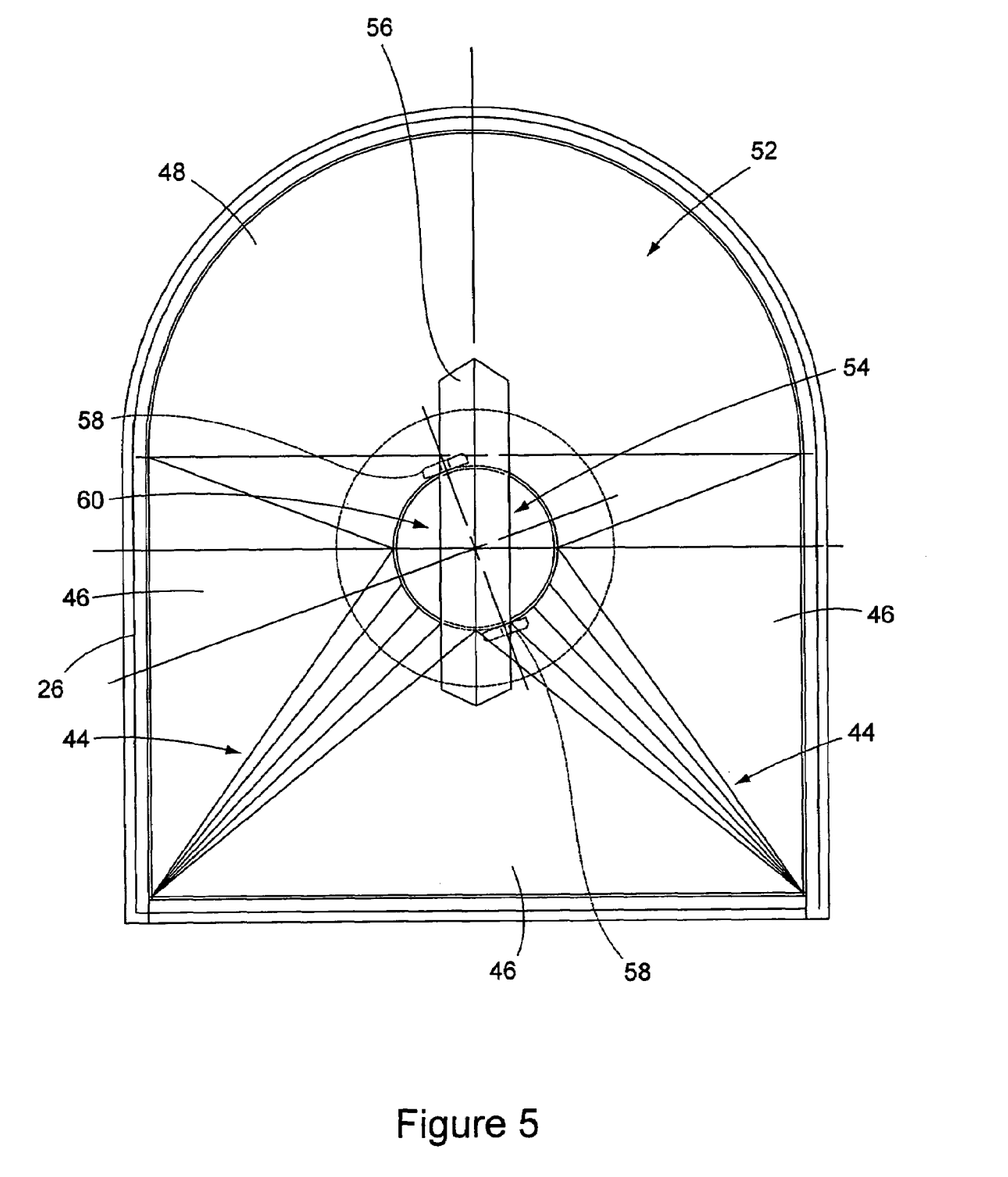
FIG. 5 is a top plan view of the transition section of the apparatus.

FIG. 5 is a top plan view of the transition section 26. As shown in FIG. 5, the transition section 26 is comprised of a plurality of wall panels that give the section its general funnel shape. The panels include a plurality of elongated triangular panels 44, a plurality of larger triangular panels 46 and a generally arcuate panel 48 that are secured together side by side to define the rounded funnel shape of the transition section. The configurations and positioning of the panels 44, 46, 48 defines an interior volume of the transition section 26 that has a cross-sectional area that decreases as the transition section extends downwardly from a top opening 52 to a bottom opening 54 of the transition section. The plurality of panels 44, 46, 48 give the transition section 26 an interior surface that is curved on all sides of the transition section 26 directly below the hood 22. The curved surfaces are designed to allow the material falling through the transition section from the top opening 52 to the bottom opening 54 to concentrate into a stream with a reduced cross-sectional area profile. The panels 44, 46, 48 can be lined with or constructed of materials that are resistant to abrasion or wear. The panel material is specifically selected to meet parameters for wear as well as a coefficent of friction that determines the material velocity. The panels 44, 46, 48 of the transition section 26 are designed with a sufficient slope to prevent plugging and the buildup of material in the transition section. The combination of the sloped panels 44, 46, 48 of the transition section, the reducing cross-sectional area of the transition section, the panel material coefficient of friction and transition section length control the material profile and the velocity of flow through the section and minimize entrained air in the material, minimize material accumulation, minimize the degradation of the material, and minimize the generation of dust due to collisions of the material.

A diverter plate 56 is secured to the interior of the transition section 26. The diverter plate 56 is spaced above and is centered relative to the transition section bottom opening 54. The position of the diverter plate is determined by the type of material to pass through the chute, the typical volume of the material to be passed through the chute, and the length of the chute vertical drop from the discharge conveyor to the receiving conveyor. The diverter plate 56 has a V-shaped cross section with the apex of the V directed upwardly so as to divert the flow of material around the plate and not provide a shelf on which material can accumulate. The space directly below the diverter plate can be used to mount other devices out of the way of the material flow to avoid deterioration or damage to the devices due to contact with the material flow. For example, devices such as fire protection devices, chemical distribution devices, control devices and others can be positioned directly beneath the diverter plate 56.

The diverter plate 56 is positioned in the center of the transition section 26 toward the bottom of the section and directly above the circular bottom opening 54 of the section. The diverter plate 56 functions to split the stream of material as it flows downwardly across the rear interior wall surface of the transition section 26 diverting a portion of the material stream to each side of the section bottom opening 54. Some of the diverted material will be backwashed and return to the transition section rear wall and some of the material will flow freely to the front of the section bottom opening 54. This functioning of the diverter plate 56 assures even distribution of the material flow through the transition section bottom opening 54 while reducing the amount of entrained air traveling with the material flow.

In the preferred embodiment, the diameter dimension of the transition section bottom opening 54 is designed in consideration of the bridging effect based on the maximum material particle size as determined by standard engineering practice. The height of the lower end of the diverter plate 56 as shown in FIG. 6 has been determined by experimentation to be one and a half times the dimension of the transition section bottom opening 54 to account for the bridging effect along with the reduced material velocity resulting from impact with the diverter plate 56.

A pair of pivot pin mounts having coaxially aligned holes 58 are mounted on diametrically opposite sides of the transition section. The pivot mounts 58 are positioned adjacent the bottom opening 54 of the transition section. As will be explained, the pivot mounts 58 are used in mounting the loading tube 28 to the transition section 26.

Figure 6:
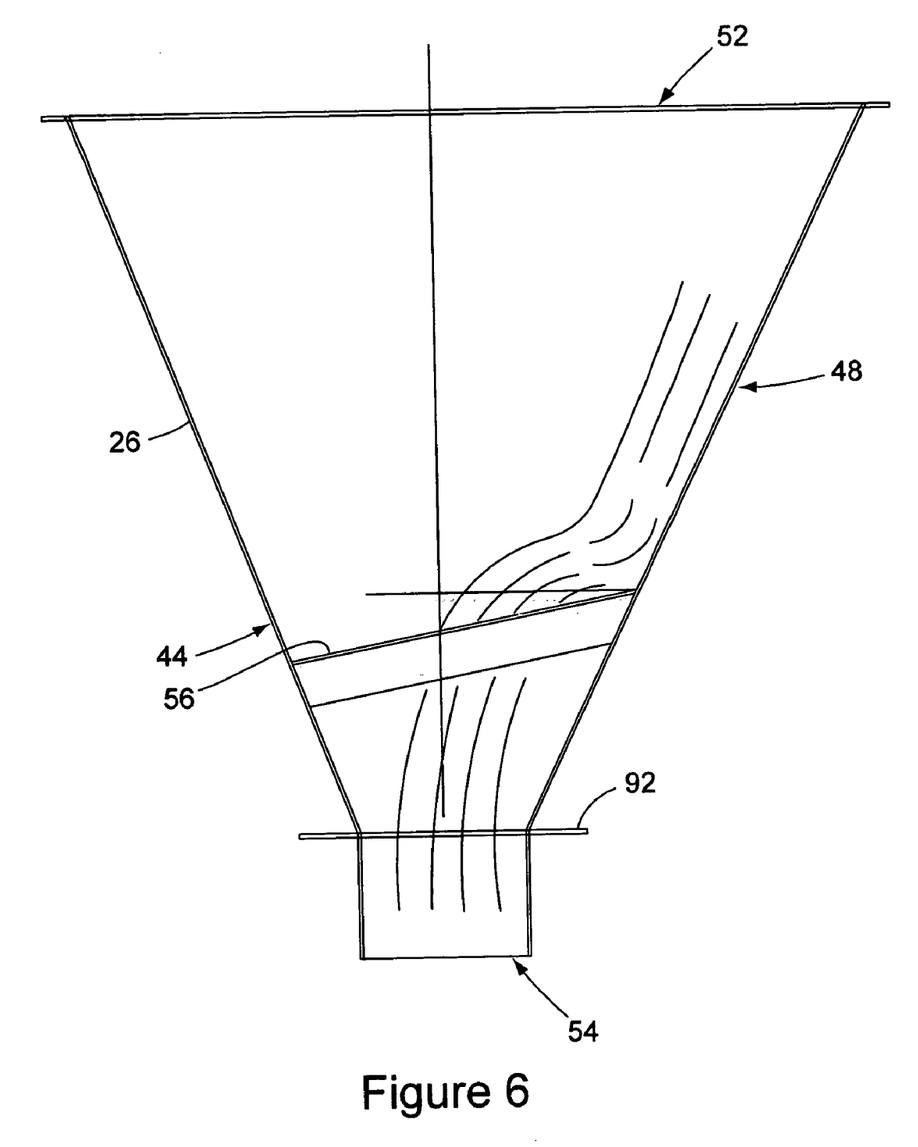
FIG. 6 is a side, sectioned view of the transition section.
Figure 7:
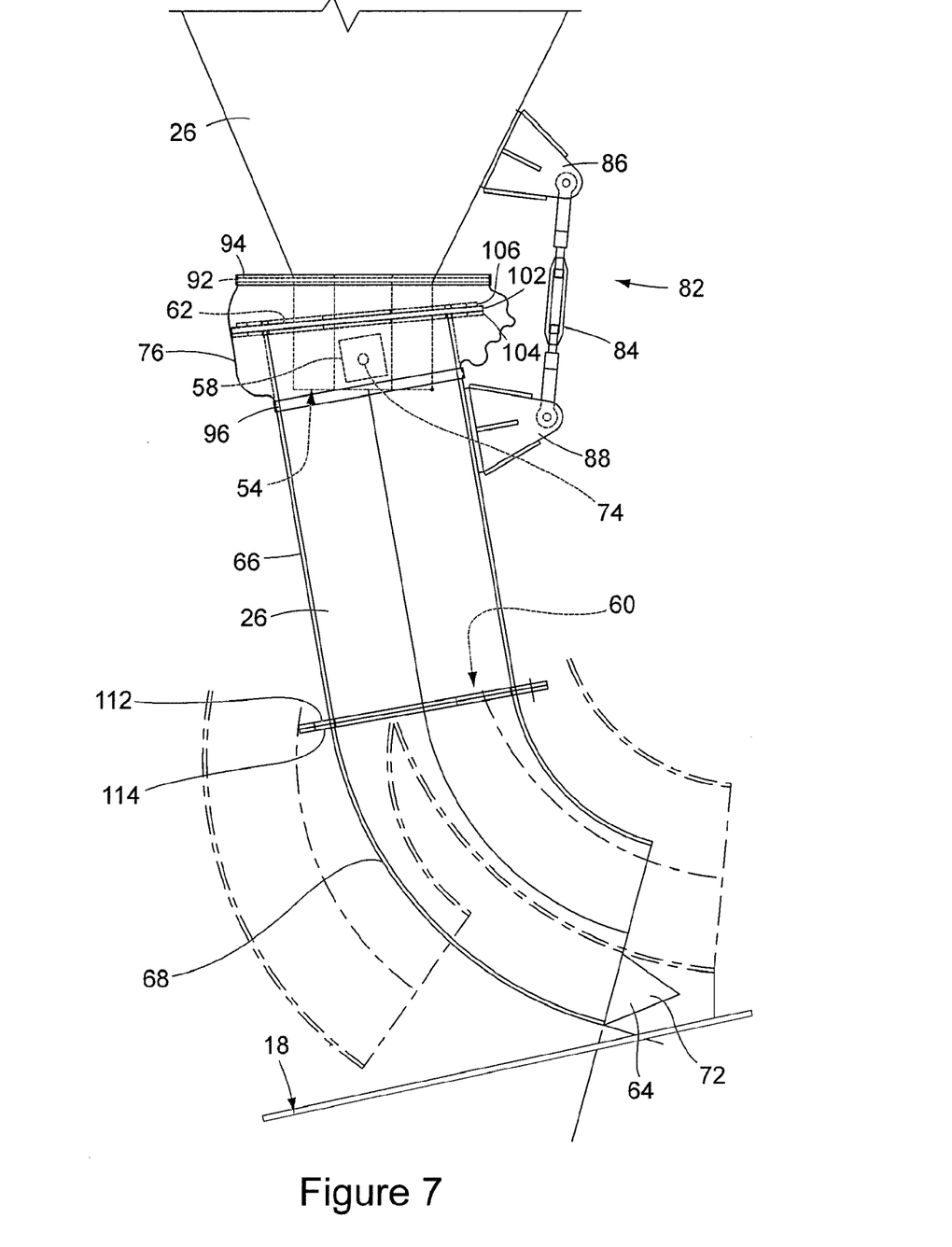
FIG. 7 is a partial view showing a lower portion of the apparatus.

As shown in FIGS. 1, 2 and 6, the loading tube 28 is suspended beneath the transition section 26 of the apparatus 10. The loading tube 28 has a hollow interior bore 60 that extends from an input end 62 of the tube to an output end 64 of the tube. In the preferred embodiment, the interior bore 60 has a circular cross-sectional area through the entire length of the loading tube from the input end 62 to the output end 64. A non-circular cross section may also be used. A pair of triangular wing guides 72 project outwardly from the tube output end 64. As best seen in FIG. 7, the loading tube 28 can be comprised of multiple upper portions 66 and a lower portion 68. The loading tube input end 62 on the tube upper portion 66 surrounds the transition section bottom opening 54 with the bottom opening being positioned in the interior of the loading tube 28. A pair of coaxial pivot pins 74 project inwardly from diametrically opposite sides from the interior of the loading tube upper portion 66. The pins 74 engage in the holes of the pivot mounts 58 on the transition section 26. The loading tube pins 74 and the pivot mounts 58 provide a connection assembly that mounts the loading tube 28 to the bottom end of the transition section 26. The pivoting connection enables the loading tube 28 to be pivoted through an arc relative to the transition section 26 between first and second positions of the tube 28 shown in dashed lines in FIG. 7. Other types of connections permitting relative movement between the loading tube 28 and the transition section 26 may be employed. As best seen in FIG. 7, the loading tube lower portion 68 extends through a continuous curve from the loading tube upper portion 66 to the output end 64 of the loading tube. This curved portion of the loading tube 28 is designed to place the material discharged from the tube onto the belt of the receiving conveyor 18 at an angle and velocity of discharge that minimizes impact of the material onto the belt and thereby reduces impact damage to the belt and minimizes the generation of dust. The ability of the loading tube 28 to be moved relative to the transition section 26 also enables the tube to position and profile the discharged material properly onto the belt of the receiving conveyor 18 to minimize the likelihood of material spillage from belt.

Figure 9:
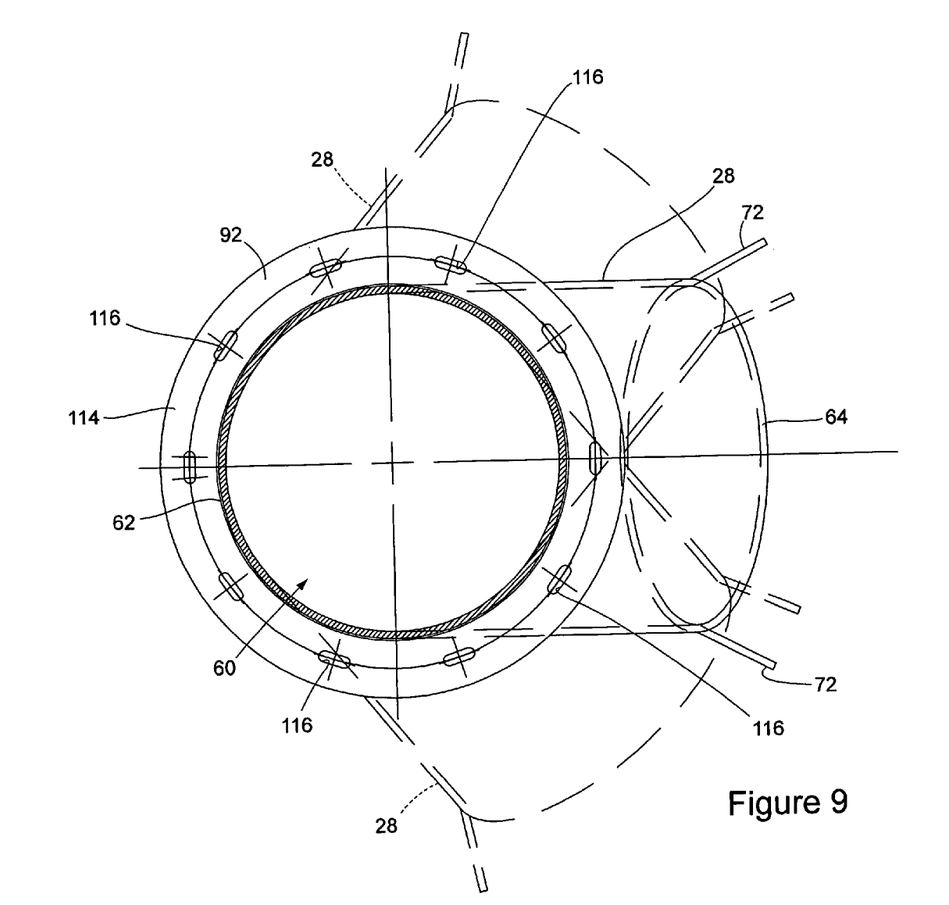
FIG. 9 is a top plan view of the loading tube of the apparatus.

The pair of wing guides 72 are formed at the lower end of the loading tube 28 at the tube output end 64. The wing guides 72 function to provide a guide for the material as it exits the loading tube output end 64 to form the material in its natural profile when transferred to the receiving conveyor. In the preferred embodiment, the height of the wing guides 72 on the tube output end 64 and the length to which the wing guides extend from the output end is equal to the approximate cross sectional height of the material exiting the tube output end as determined by standard engineering practice. For ease of manufacturing and as determined by experimentation, the wing guide length is equal to the wing guide height. As shown in the top plan view of the wing guides 72 in FIG. 9, the wing guides are bent outwardly away from the center of the loading tube output end 64. The dimension between the distal tips of the wing guides 72 as viewed in FIG. 9 is equal to the normal width of the material profile in its natural position on the receiving conveyor as determined by standard engineering practice.

A rubber primary seal or boot 76 surrounds the connection between the loading tube 28 and the transition section 26. The seal 76 provides a dust-tight seal between the connection of the loading tube 28 and the transition section 26.

An adjustment mechanism 82 is connected between the loading tube 28 and the hopper transition section 26 of the apparatus. In the example shown, the adjustment mechanism 82 includes a linear actuator 84 that is connected by pivot connections to a flange 86 that projects from the transition section 26 and a flange 88 that projects from the loading tube 28. Other similar functioning mechanisms may be used in lieu of the actuator 84. Adjusting the length of the actuator 84 adjusts the angular position of the loading tube 28 relative to the transition section 26. Thus, the mechanism 82 allows for the angular adjustment of the loading tube 28 relative to the belt of the receiving conveyor 18, thereby enabling the adjustment of the angle of discharge and velocity of material from the loading tube 28 onto the belt of the receiving conveyor 18. As stated earlier, the angular adjustment of the loading tube 28 relative to the receiving conveyor 18 minimizes spillage of the material discharged from the tube onto the belt of the conveyor, minimizes material accumulation, minimizes wear to the belt of the conveyor, and minimizes the generation of dust.

The boot 76 functions as a primary seal between the transition section 26 and the loading tube 28. As shown in FIG. 7, the top of the primary seal 76 is secured around a circular flange 92 on the transition chute 26 by a two-piece circular clamp 94. A lower end of the primary seal 76 is secured around the loading tube 28 by another two-piece, circular clamp 96. The primary seal 76 functions to eliminate any dust emissions escaping from the flexible pivoting connection between the transition section 26 and the loading tube 28. The primary seal 76 is preferably constructed of a chemical resistant impermeable membrane such as, but not limited to, PVC coated nylon material. In addition to chemical resistance, this material should be weather and UV resistant for outside applications. The actual material properties should be determined by standard engineering practice based on specific applications. The impermeable membrane 76 is loosely wrapped around the transition section 26 at its upper end and the loading tube 28 at its lower end to allow for free movement of the loading tube 28 about the pivot pin connections 74. The ends of the primary seal 76 can be heat sealed, taped, or glued to form a continuous closed surface around the transition section 26 and the loading tube 28.

A secondary seal 102 is provided inside the primary seal 76 and between the transition section 26 and the loading tube 28. The secondary seal 102 also functions to reduce dust emissions at the flexible pivoting connection between the transition section 26 and the loading tube 28.

Figure 8:
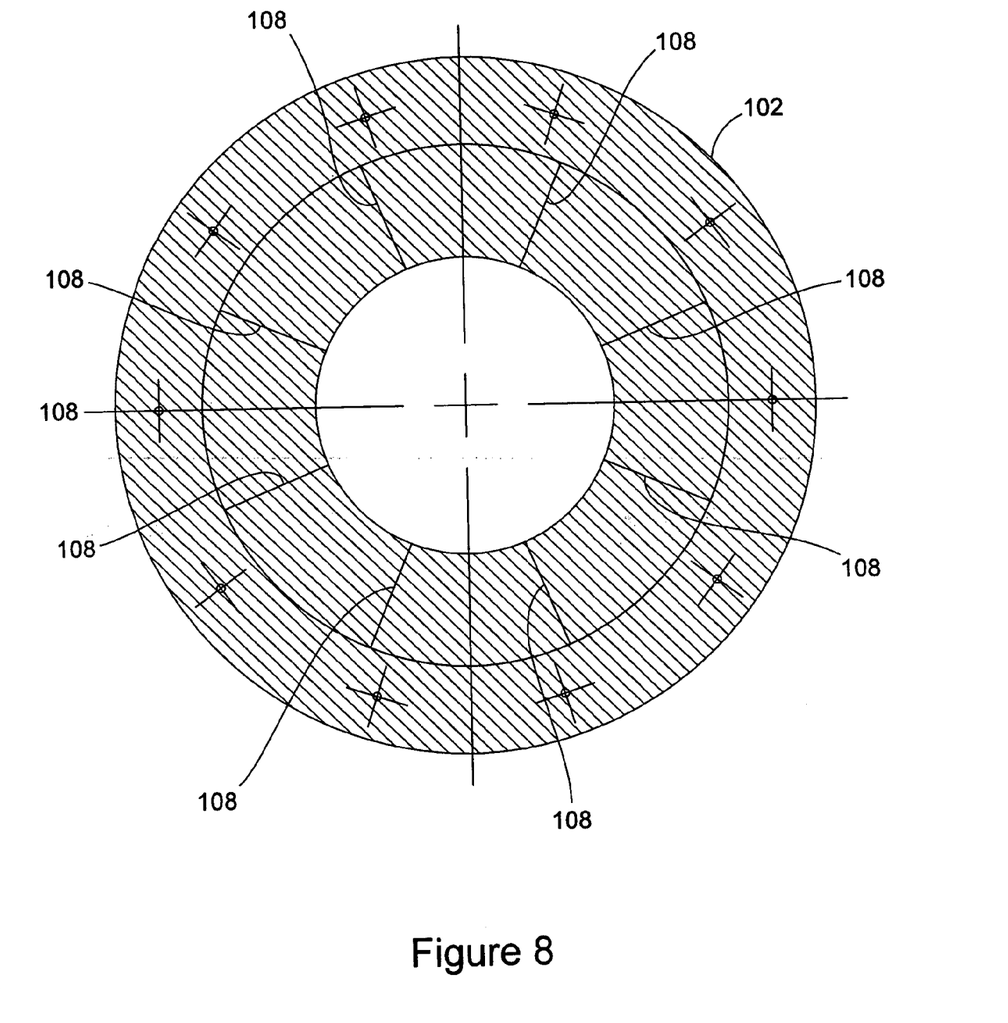
FIG. 8 is a plan view of a secondary seal.

A circular flange 104 is welded to the upper end of the transfer tube 28. A circle of bolt holes is provided through the flange 104. The circular secondary seal 102 shown in FIG. 8 is positioned on the flange 104. A circular retaining ring 106 similar in construction to the circular flange 104 is secured on top of the secondary seal 102 by a plurality of bolts.

As viewed in FIG. 9, the secondary seal 102 has a center opening that is dimensioned approximately four inches smaller than the outside diameter of the cylindrical bottom opening 54 of the transition section 26. A plurality of slits 108 are cut into the seal to allow the cylindrical bottom opening 54 of the transition section 26 to be inserted through the secondary seal 102. The circular opening and lapped edges of the secondary seal 102 with the exterior of the transition section cylindrical bottom opening 54 form a flexible semi-permeable seal allowing free movement of the loading tube 28 about its pivot connections 74 to the transition section 26.

FIGS. 7 and 9 show horizontal adjustment flanges 112, 114 that enable adjusting the horizontal position of the output end 64 of the loading tube 28. The horizontal adjustment flanges include an upper flange 112 that is secured to the bottom end of the loading tube upper portion 66, and a lower flange 114 that is secured to an upper end of the loading tube lower portion 68. Each of the flanges 112, 114 has sets of oblong holes that are spatially arranged around the circumferences of the flanges. FIG. 9 shows the oblong holes 116 in the flange 114 of the loading tube lower portion 68. The aligned holes of the two flanges 112, 114 are secured together by threaded fasteners, for example nuts and bolts. The oblong shape of the holes of the flanges enables the loading tube lower portion 68 to be moved relative to the loading tube upper portion 66 to a limited extent to horizontally position the loading tube output end 64 over the receiving conveyor 18. If a greater horizontal adjustment of the position of the loading tube output end 64 is needed, the threaded fasteners can be removed from the holes of the two flanges 112, 114 and the flanges can be rotated relative to each other to realign other holes of the two flanges to adjust the position of the loading tube lower portion 68 relative to the loading tube upper portion 66 and thereby adjust the horizontal position of the loading tube output end 64.

Although the apparatus of the invention has been described above by reference to a specific embodiment of the invention, it should be understood that variations and modifications could be made to the apparatus disclosed without departing from the intended scope of the following claims.

The invention claimed is:

1. A material transfer apparatus comprising:
a transition section having a sidewall surrounding an interior volume of the transition section, the transition section having a top opening communicating with the interior volume and a bottom opening communicating with the interior volume, the top opening being configured and dimensioned to be accessible to a discharge conveyor conveying material to the transition section and depositing material from the discharge conveyor, through the transition section top opening and into the transition section interior volume;
a loading tube having a tubular length with opposite input and output ends and a hollow interior bore extending through the loading tube, the loading tube interior bore having a cross section configuration that eliminates any corners from the interior bore in which material flowing through the loading tube could accumulate; and
a connection assembly connecting the loading tube input end to the transition section at the transition section bottom opening enabling continuously transferring material from the transition section to the loading tube and for movement of the loading tube between first and second positions of the loading tube relative to the transition section while material continuously flows through the loading tube for adjustably positioning the loading tube output end at a plurality of different orientations to adjust a rate of discharging the material from the loading tube outlet end.

2. The apparatus of claim 1, further comprising:
the loading tube being positioned directly beneath the transition section bottom opening and over a receiving conveyor, and the loading tube output end being adjustably positioned relative to the receiving conveyor to adjust a velocity of material flow from the loading tube onto the receiving conveyor.

3. The apparatus of claim 2, further comprising:
a flexible seal between the loading tube input end and the transition section bottom opening.

4. The apparatus of claim 2, further comprising:
the loading tube having a cross sectional configuration between the loading tube input end and output end that is shaped to position material discharged from the loading tube onto the receiving conveyor in a profile similar to a settled profile of the material on the receiving conveyor.

5. The apparatus of claim 2, further comprising:
the loading tube input end being positioned above the transition section bottom opening and the transition section bottom opening being positioned inside the loading tube interior bore.

6. The apparatus of claim 1, further comprising:
the connection assembly including a mechanism connected between the transition section and the loading tube that is operable to move the loading tube between the first and second positions relative to the transition section.

7. The apparatus of claim 1, further comprising:
the connection assembly including a hinge connection between the transition section and the loading tube.

8. The apparatus of claim 1, further comprising:
the connection assembly including a pair of coaxially aligned pivot pins connecting the loading tube to the transition section.

9. A material transfer apparatus comprising:
a transition section having a sidewall surrounding an interior volume of the transition section, the transition section having a top opening communicating with the interior volume and a bottom opening communicating with the interior volume, the top opening being configured and dimensioned to be accessible to a discharge conveyor conveying material to the transition section and depositing material from the discharge conveyor, through the transition section top opening and into the transition section interior volume;
a loading tube having a tubular length with opposite input and output ends and a hollow interior bore extending through the loading tube;
a connection assembly connecting the loading tube input end to the transition section at the transition section bottom opening for movement of the loading tube between first and second positions of the loading tube relative to the transition section for adjustably positioning the loading tube output end at a plurality of different orientations to adjust a rate of discharging the material from the loading tube outlet end;
the connection assembly including a mechanism connected between the transition section and the loading tube that is operable to move the loading tube between the first and second positions relative to the transition section; and
the mechanism being a linear actuator connected between the transition section and the loading tube.

10. A material transfer apparatus comprising:
a transition section having a sidewall surrounding an interior volume of the transition section, the transition section having a top opening communicating with the interior volume and a bottom opening communicating with the interior volume, the top opening being configured and dimensioned to be accessible to a discharge conveyor conveying material to the transition section and depositing material from the discharge conveyor, through the transition section top opening and into the transition section interior volume;
a loading tube having a tubular length with opposite input and output ends and a hollow interior bore extending through the loading tube;
a connection assembly connecting the loading tube input end to the transition section at the transition section bottom opening for movement of the loading tube between first and second positions of the loading tube relative to the transition section for adjustably positioning the loading tube output end at a plurality of different orientations to adjust a rate of discharging the material from the loading tube outlet end; and
the loading tube length being formed in a continuous curve between the loading tube input and output ends.

11. A material transfer apparatus comprising:
a transition section having a sidewall surrounding an interior volume of the transition section, the transition section having a top opening communicating with the interior volume and a bottom opening communicating with the interior volume, the top opening being configured and dimensioned to be accessible to a discharge conveyor conveying material to the transition section and depositing material from the discharge conveyor, through the transition section top opening and into the transition section interior volume;
a loading tube having a tubular length with opposite input and output ends and a hollow interior bore extending through the loading tube;
a connection assembly connecting the loading tube input end to the transition section at the transition section bottom opening for movement of the loading tube between first and second positions of the loading tube relative to the transition section for adjustably positioning the loading tube output end at a plurality of different orientations to adjust a rate of discharging the material from the loading tube outlet end;
the connection assembly including a mechanism connected between the transition section and the loading tube that is operable to move the loading tube between the first and second positions relative to the transition section; and
the mechanism having a length that extends between the transition section and the loading tube, and the mechanism length being adjustable to move the loading tube relative to the transition section in response to changing the mechanism length.

12. A material transfer apparatus comprising:
a transition section having a sidewall surrounding an interior volume of the transition section, the transition section having a top opening communicating with the interior volume and a bottom opening communicating with the interior volume, the top opening being configured and dimensioned to be accessible to a discharge conveyor conveying material to the transition section and depositing material from the discharge conveyor, through the transition section top opening and into the transition section interior volume;
a loading tube having a tubular length with opposite input and output ends and a hollow interior bore extending through the loading tube;
a flexible primary seal between the transition section and the loading tube; and,
a flexible secondary seal between the transition section and the loading tube and inside the primary seal.

13. The apparatus of claim 12, further comprising:
the primary seal being secured to the transition section and secured to the loading tube; and,
the loading tube being movable relative to the transition section.

14. The apparatus of claim 13, further comprising:
the secondary seal being secured to the loading tube for movement with the loading tube.

15. The apparatus of claim 14, further comprising:
the secondary seal being a flat, circular seal.

16. The apparatus of claim 15, further comprising:
the primary seal being a cylindrical seal.

17. The apparatus of claim 12, further comprising:
a diverter plate inside the transition section, the diverter plate having an inverted V-shaped cross section with an apex directed upwardly.

18. A material transfer apparatus comprising:
a transition section having a sidewall surrounding an interior volume of the transition section, the transition section having a top opening communicating with the interior volume and a bottom opening communicating with the interior volume, the top opening being dimensioned and configured to be accessible to a discharge conveyor conveying material to the transition section and depositing the material from the discharge conveyor, through the transition section top opening and into the transition section interior volume; and,
a loading tube having a tubular length with opposite input and output ends and a hollow interior bore extending through the loading tube, the loading tube having a circular cross section along the length of the loading tube from the loading tube input end to the loading tube output end, and the loading tube length being formed in a continuous curve from the loading tube input end to the loading tube output end.

19. The apparatus of claim 18, further comprising:
a curvature of the loading tube positioning the loading tube output end at a desired orientation for discharging material from the loading tube output end onto an receiving conveyor.

20. The apparatus of claim 19, further comprising:
a connection assembly connecting the loading tube to the transition section for movement of the loading tube between first and second positions relative to the transition section.

21. The apparatus of claim 20, further comprising:
the connection assembly including a pivot connection between the loading tube and the transition section that enables the loading tube to pivot through an arc between the first and second positions of the loading tube relative to the transition section.

* * * * *